United States Patent [19]
Wilhelm

[11] Patent Number: 5,638,602
[45] Date of Patent: Jun. 17, 1997

[54] CABLE SEVERANCE TOOL

[75] Inventor: Gary Lee Wilhelm, Statesboro, Ga.

[73] Assignee: Cooper Industries, Houston, Tex.

[21] Appl. No.: 423,071

[22] Filed: Apr. 17, 1995

[51] Int. Cl.$^6$ ............................................ B26B 13/06
[52] U.S. Cl. ............................................ 30/254; 30/90.1
[58] Field of Search ................... 30/254–262, 251, 30/252, 250, 245, 90.1

[56] References Cited

U.S. PATENT DOCUMENTS

| | | | |
|---|---|---|---|
| 1,632,284 | 6/1927 | Gardiner | 30/257 |
| 2,794,250 | 6/1957 | Behune | 30/254 |
| 4,121,338 | 10/1978 | Siden et al. | 30/257 |
| 4,899,445 | 2/1990 | Erbrick et al. | 30/251 |

FOREIGN PATENT DOCUMENTS

1063595  5/1954  France.

*Primary Examiner*—Douglas D. Watts
*Attorney, Agent, or Firm*—Burns, Doane, Swecker & Mathis, L.L.P.

[57] ABSTRACT

A cable severance tool (10) having approximately flat cutting edges (40). An opening (41) formed by the edges (40) as the severance heads move together is preferably approximately elliptical, oval or hexagonal-shaped. The flat severance edge (40) and the elongated opening (41) formed, allows hardened steel strands (4) of wire cable (1) to be gathered and severed rather than cut.

11 Claims, 8 Drawing Sheets

CABLE SEVERANCE TOOL

BACKGROUND OF THE INVENTION

1. Technical Field of the Invention

This invention relates to cable cutting tools in general and, in particular, to tools for severing hardened steel wire cables.

2. Related Prior Art Tools

Figure 1:
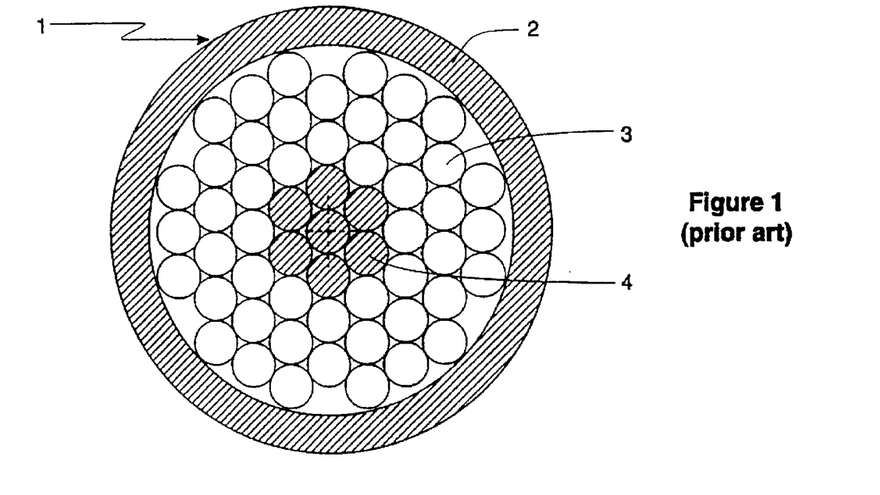
FIG. 1 shows a sectional end view of one type of cable, a cable severance tool according to the present invention is designed to sever.

Prior art cable cutting tools slice through steel wire cables in a scissor action, which uses two sharpened opposing edges to cut the cable. A problem arises when hardened steel wire strands are used to reinforce the cable. The sharpened edges of the tool are blunted after several cuts and the tool is damaged to the point that it is useless. For example, referring now to FIG. 1, a multistrand power transmission cable is shown, referred to, in general, by numeral 1. Cable 1 is comprised of an insulating jacket 2, usually of plastic or rubber. Jacket 2 surrounds aluminum wires 3, which in turn surround hardened steel wires 4. The aluminum wires transmit electricity, and the steel wires are for strength. This type of cable is sometimes called an "ASRC" or by the brand name "ZEBRA CABLE".

Figure 2:
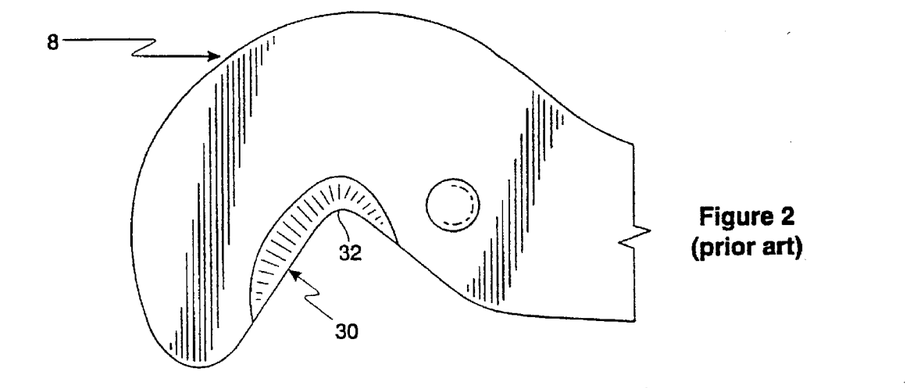
FIG. 2 is a plan view of a prior art cable cutting tool.
Figure 2A:
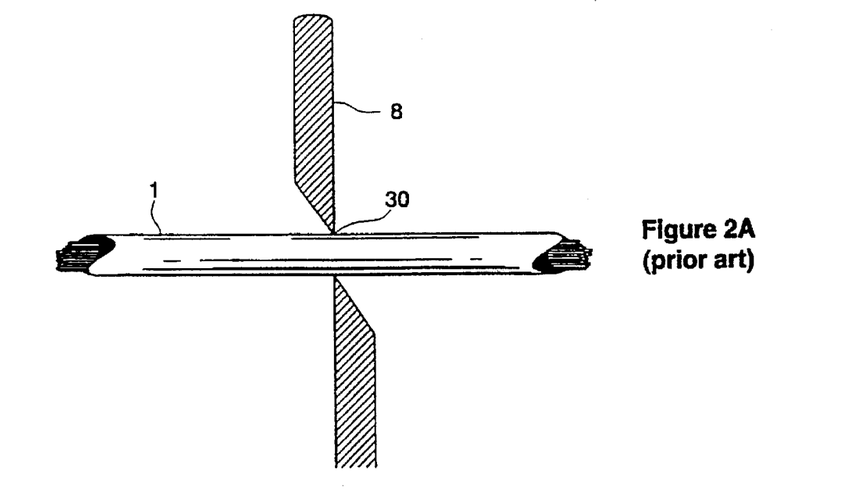
FIG. 2A shows a sectional view on the center line of a cable being cut by a prior art cable cutting tool.

Prior art cable cutters 8, type shown in FIG. 2, have a sharpened cutting edge 30. These edges dull quickly, or break, when cutting hardened steel wire strands. An additional problem is that these tools bunch the hardened steel wire strands so that there is a concentration of stress at a particular point, for example point 32. Point 32 is where damage to edge 30 usually occurs first. There is a need for a cable separation tool that is not subject to the above-listed prior art disadvantages and thus, can repetitively provide an efficient means of separating cable without the need for maintenance or repair, e.g., the sharpening of edges.

SUMMARY OF THE INVENTION

The present invention uses flattened edges on the tool to sever, i.e., to separate the wire strands rather than cut them. Specifically, the cable severance tool of the present invention comprises two arms, severance heads attached to each arm having approximately flattened edges, and a pivot attaching the two arms so that as the two arms are moved together the heads approach each other.

A preferred severance tool of the present invention is constructed such that when the two arms are completely moved together the cable is severed not cut by the flattened edges. For example, in a most preferred embodiment the cable severance tool of the present invention is constructed such that, in use, cables are severed by shearing not cutting. The preferred embodiments also employ a shape on the opposing edges of the tool which gather the wire strands into a compact-shaped group to reduce stress points on the tool. Particularly preferred shapes include generally oval, hexagonal, and elliptical shapes.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION OF THE INVENTION

Figure 3:
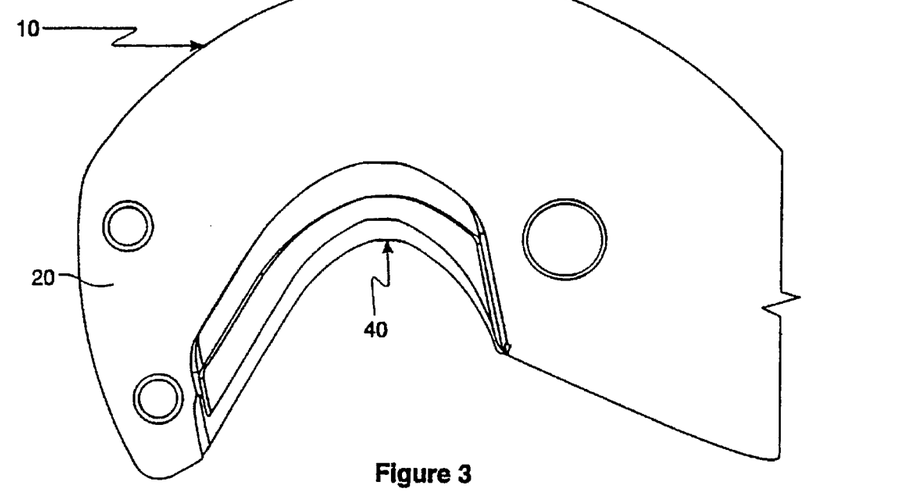
FIG. 3 shows a plan view of a cable severance tool according to the present invention.
Figure 4:
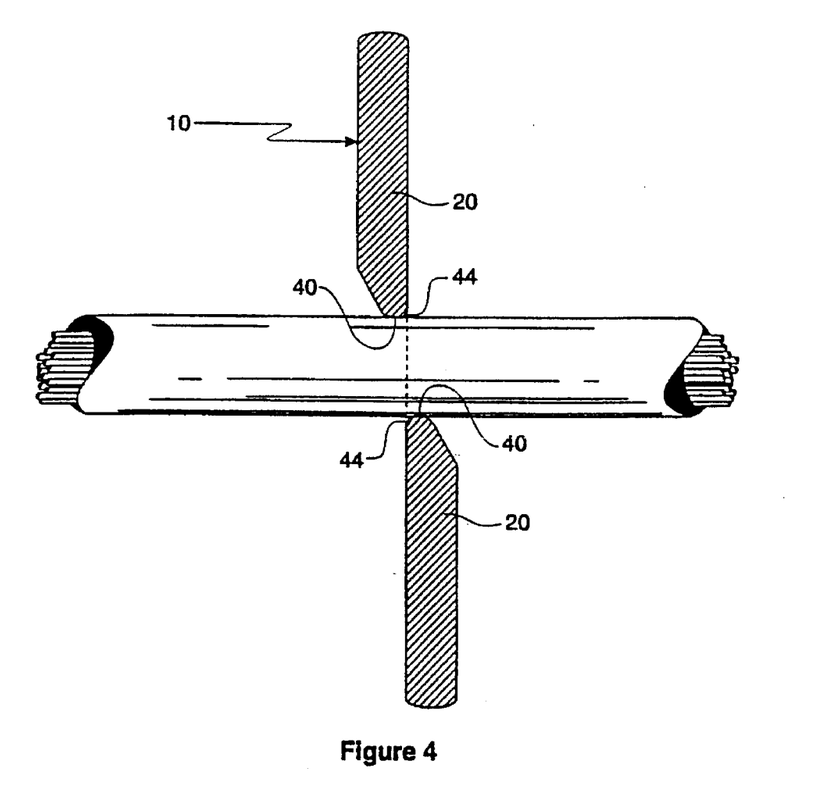
FIG. 4 shows a sectional view on the center line of a cable being severed utilizing a tool of the present invention.

Referring to FIGS. 3 and 4, edge 40 of severance head 20 enables cable severance tool 10 to sever the hardened steel strands of cable 1 rather than cut them. This may be accomplished by applying a pair of opposing force interfaces, like severance heads 20 and flattened edges 40 thereon, wherein said interfaces are perpendicular to a desired separation plane of a wire, cable, or strands therein. The opposing forces are applied in a non-coplanar fashion and are substantially parallel to each other and the desired separation plane. Since there are no sharpened edges to dull or break, the life of the tool is increased.

A rounded edge 44 (FIG. 4) has been incorporated in the preferred embodiment to alleviate stress on the edge of approximately flat surface 40. It is believed a square edge would roll and reduce cutting efficiency. The preferred radius of rounded edge 44 is about 0.005 to about 0.010 inch.

Figure 5:
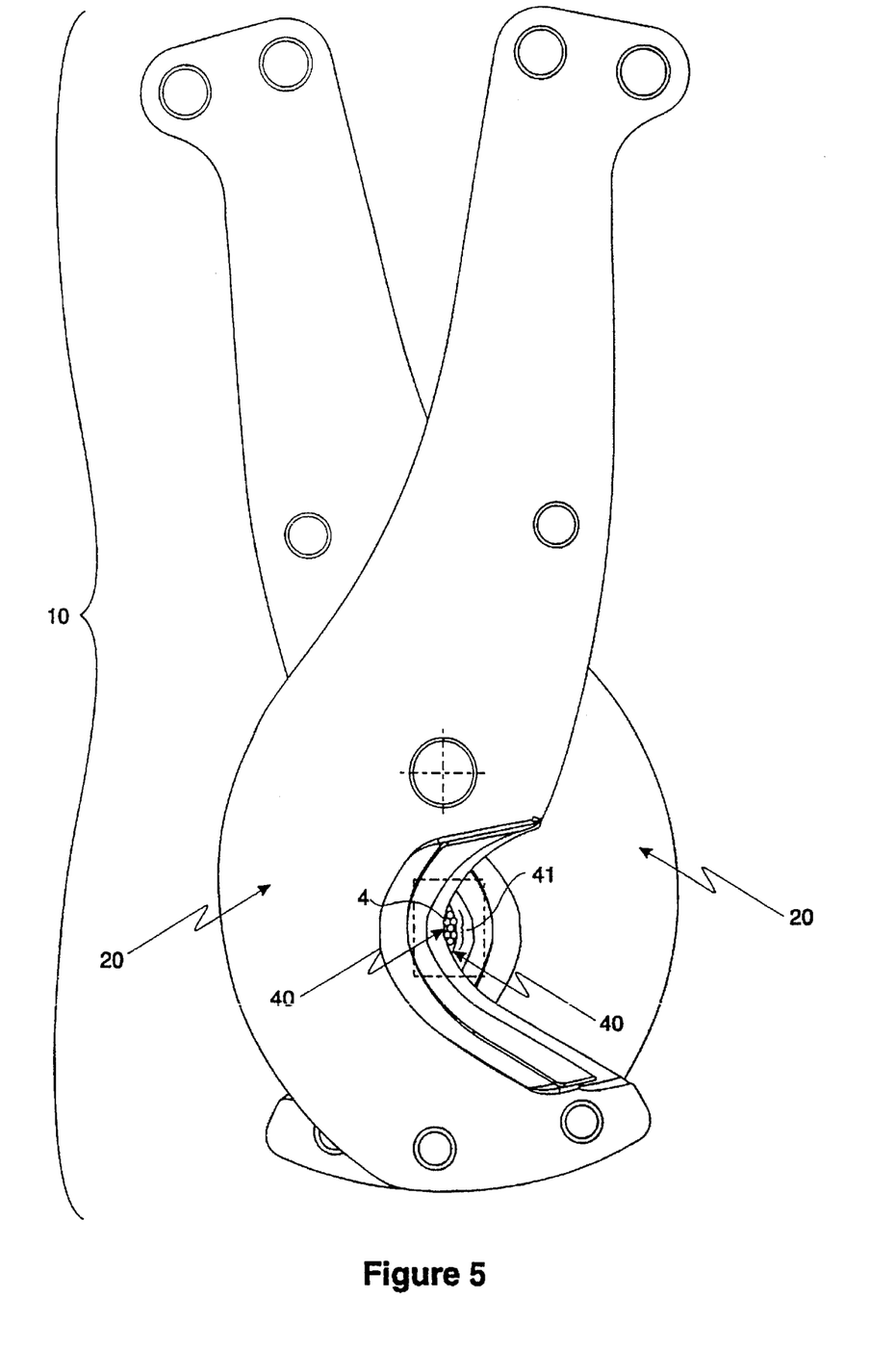
FIG. 5 shows a plan view of one embodiment of the present invention.

FIG. 5 shows severance heads 20 of cable severance tool 10 immediately prior to severing cable 1. At this point in the severing operation, jacket 2 and aluminum wires 3 have been squeezed back out of the way by tool 10. The opposing edges 40 form an opening 41 that generally is approximately elliptical. This shape squeezes the hardened steel wires 4 into a flattened shape that is easily severed by cable severance tool 10. Alternatively, the shape of opening 41 may be oval or hexagonal.

Figure 6:
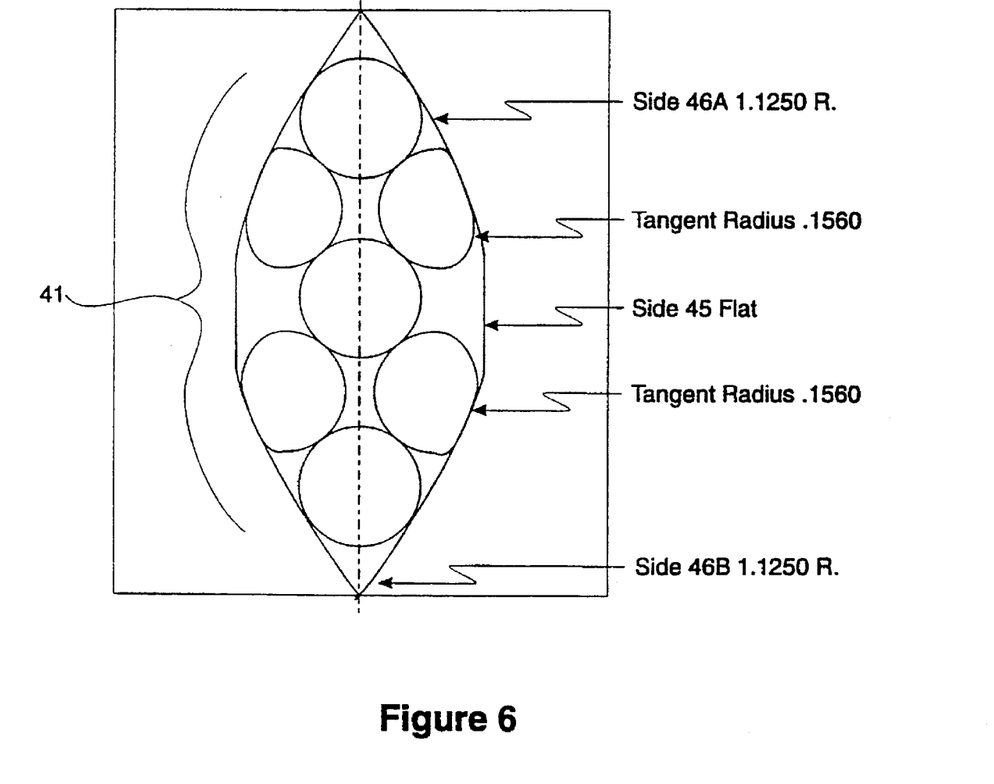
FIG. 6 shows a plan view of the opening of one embodiment of the present invention.

FIG. 6 shows the preferred approximately elliptically shaped opening 41 for severing "ZEBRA CABLE" or "ASRC" having seven hardened steel wire support strands of approximately 1/8 inch diameter. As shown, each side of the opening is comprised of basically three side components, 45, 46A and 46B. Sides 46A and 46B have a curvature with a radius of approximately 1.1250. Side 45 is approximately flat. The point at which opposing edges 40 meet are tangent radius to reduce stress. The radii of this curve in the preferred embodiment is a true tangent between sides 45 and 46. As shown in FIG. 6, the opposing sides of opening 41 are mirror images of each other.

Figure 7:
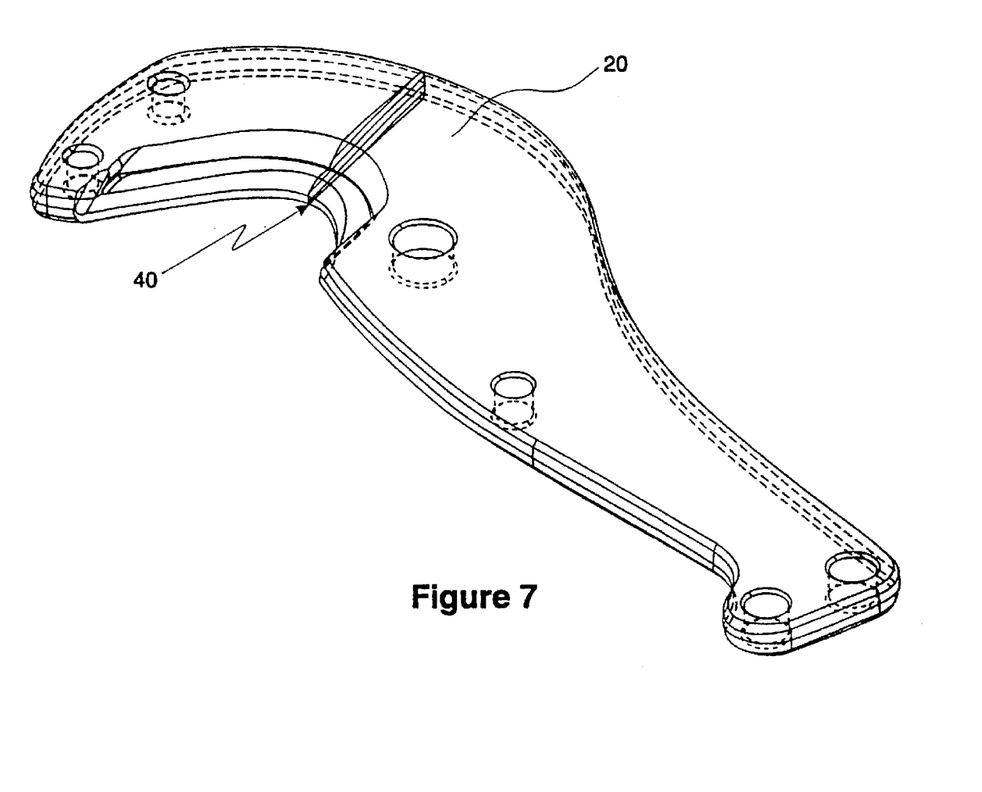
FIG. 7 is an isometric view of one arm of one embodiment of the present invention.

FIG. 7 shows the isometric view of one arm of one preferred embodiment of the present invention having head 20 and edge 40 for use in severing "ZEBRA CABLE" or "ASRC" cable strands.

Figure 8:
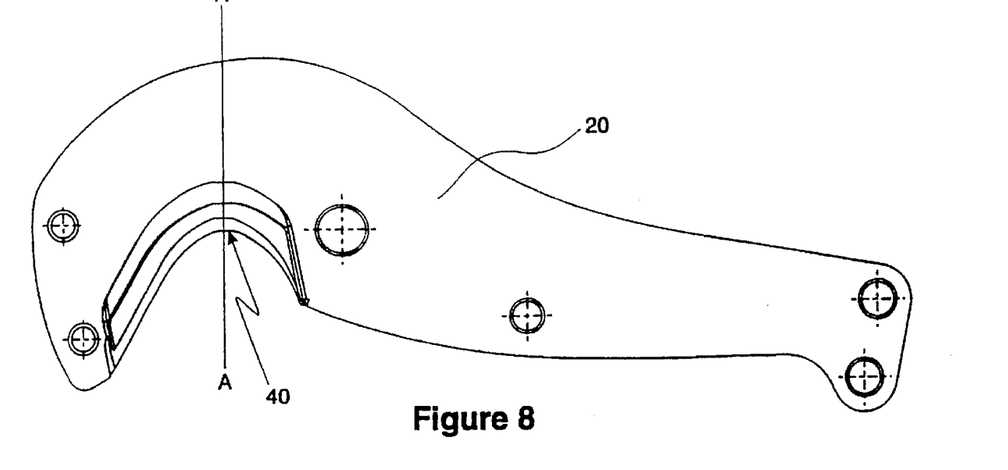
FIG. 8 is a plan view of one arm of one embodiment of the present invention.
Figure 8A:
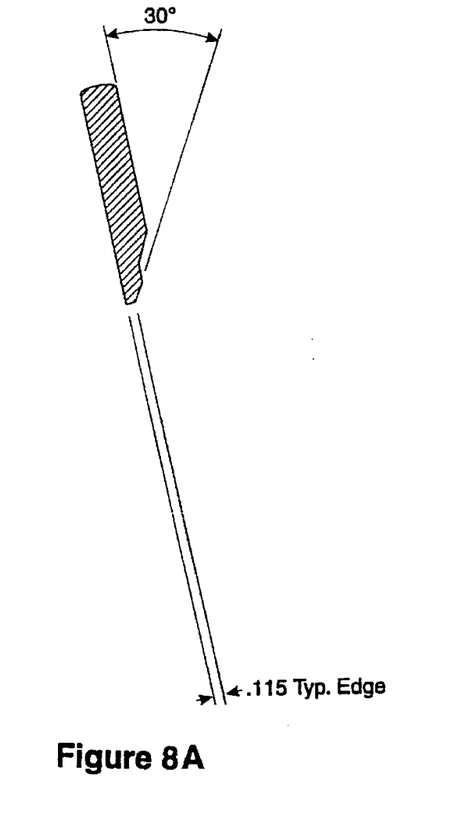
FIG. 8A illustrates a section view of a cutting head of the arm of FIG. 8 taken along the line A—A.

FIG. 8 shows a plan view of one arm of one preferred embodiment of the present invention for serving "ZEBRA CABLE" or "ASRC" cable having head 20 and edge 40. Also shown, is section line A—A and the preferred angle of edge 40.

Figure 9:
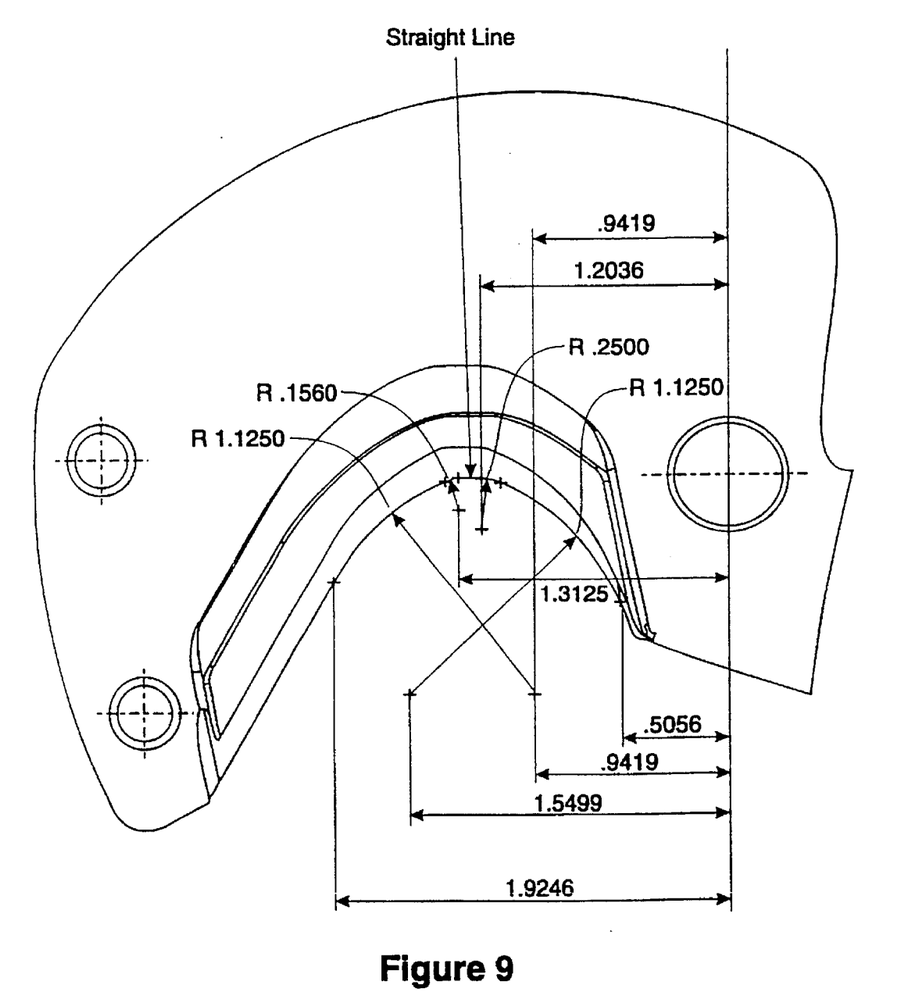
FIG. 9 is a plan view of one head of one embodiment of the present invention.
Figure 10:
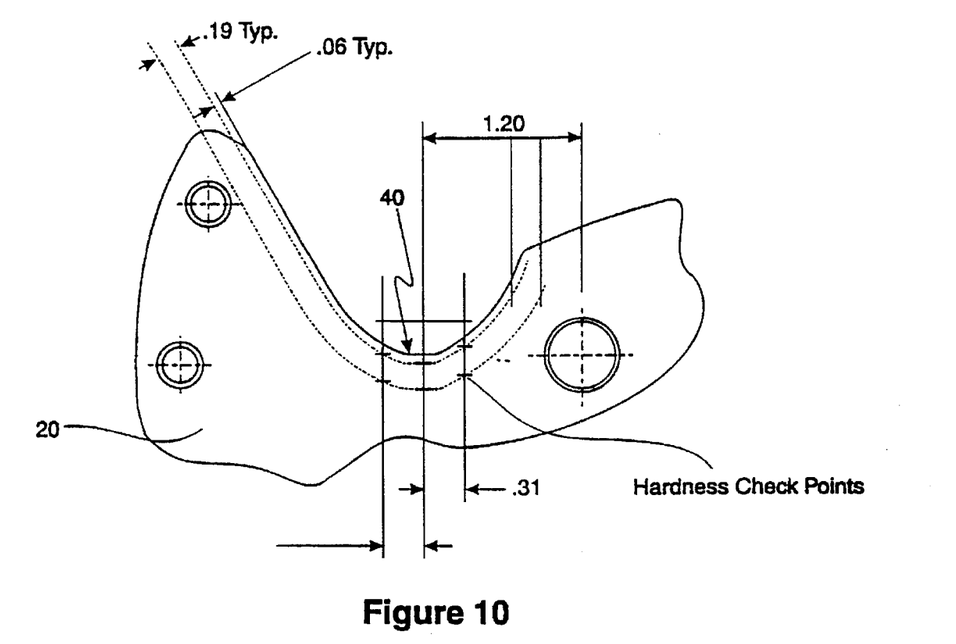
FIG. 10 is a plan view of one head of one embodiment of the present invention.

FIG. 9 is a detailed schematic giving the preferred dimensions of opening 41 (only half shown) for the preferred embodiment of the present invention for severing a "ZEBRA CABLE" or "ASRC" cable strands.

I claim:

1. A cable severing tool, comprising:

first and second members, each comprising an arm having a first planar surface and a severing head with a concave severing edge, the curvature of the severing edge lying in a plane parallel to the first planar surface;

the first and second members being disposed with portions of the respective first planar surfaces in contact and the concave severing edges in facing relationship toward an axial centerline of the tool, the first and second members being connected at a pivot for movement including converging movement in which the severing heads move toward each other and overlap, the first planar surfaces defining between them a severance plane;

wherein each severing edge includes a flat face substantially perpendicular to the severing plane and a land extending from the flat face toward a second planar surface parallel to the first planar surface, the land being oblique to both the flat face and second surface, wherein the land is oriented at an angle of about 30° to the second surface.

2. The cable severing tool according to claim 1, wherein the severing edges are shaped so that during pivoting movement of the arms moving the severing heads toward each other the severing edges define an elongated opening that decreases in length and width as the severing heads converge.

3. The cable severing tool according to claim 2, wherein each severing edge includes a straight portion between curved portions, the straight portion being located in each severing edge so that the elongated opening includes the straight portions throughout movement of the severing heads.

4. The cable severing tool according to claim 2, wherein the elongated opening defined by the severing edges tapers from a middle portion toward each end along the tool axis.

5. The cable severing tool according to claim 1, wherein the severing edge further includes a relief surface substantially perpendicular to the flat face and extending from the land opposite the flat face.

6. The cable severing tool according to claim 5, wherein a second land extends from the relief surface toward the second planar surface, the second land being oblique to the relief surface and the second planar surface.

7. A cable severing tool, comprising:

first and second members, each comprising an arm having a first planar surface and a severing head with a concave severing edge, the curvature of the severing edge lying in a plane parallel to the first planar surface;

the first and second members being disposed with portions of the respective first planar surfaces in contact and the concave severing edges in facing relationship toward an axial centerline of the tool, the first and second members being connected at a pivot for movement including converging movement in which the severing heads move toward each other and overlap, the first planar surfaces defining between them a severance plane;

wherein each severing edge includes a flat face substantially perpendicular to the severing plane and a land extending from the flat face toward a second planar surface parallel to the first planar surface, the land being oblique to both the flat face and second surface, wherein the severing edge further includes a relief surface substantially perpendicular to the flat face and extending from the land opposite the flat face, and wherein a second land extends from the relief surface toward the second planar surface, the second land being oblique to the relief surface and the second planar surface.

8. The cable severing tool according to claim 7, wherein the severing edges are shaped so that during pivoting movement of the arms moving the severing heads toward each other the severing edges define an elongated opening that decreases in length and width as the severing heads converge.

9. The cable severing tool according to claim 8, wherein each severing edge includes a straight portion between curved portions, the straight portion being located in each severing edge so that the elongated opening includes the straight portions throughout movement of the severing heads.

10. The cable severing tool according to claim 8, wherein the elongated opening defined by the severing edges tapers from a middle portion toward each end along the tool axis.

11. The cable severing tool according to claim 7, wherein the land is oriented at an angle of about 30° to the second surface.

* * * * *